United States Patent
Clark et al.

(10) Patent No.: US 10,749,759 B2
(45) Date of Patent: Aug. 18, 2020

(54) SYSTEM AND METHOD TO PROVIDE NETWORK INSIGHTS FOR CORRECT AND EFFICIENT NETWORK CONFIGURATION

(71) Applicant: Hewlett Packard Enterprise Development LP, Houston, TX (US)

(72) Inventors: Charles F. Clark, Roseville, CA (US); Craig Joseph Mills, Roseville, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/934,830

(22) Filed: Mar. 23, 2018

(65) Prior Publication Data
US 2019/0296983 A1  Sep. 26, 2019

(51) Int. Cl.
*H04L 12/24* (2006.01)
*G06F 16/23* (2019.01)
(Continued)

(52) U.S. Cl.
CPC ............ *H04L 41/22* (2013.01); *G06F 3/0482* (2013.01); *G06F 16/2365* (2019.01); *G06F 16/951* (2019.01); *H04L 41/06* (2013.01); *H04L 41/08* (2013.01); *H04L 41/0853* (2013.01); *H04L 41/0869* (2013.01); *H04L 41/0893* (2013.01); *H04L 41/145* (2013.01)

(58) Field of Classification Search
CPC ..................................................... H04L 41/22
USPC ........................................................ 709/220
See application file for complete search history.

(56) References Cited

U.S. PATENT DOCUMENTS 6,992,991 B2 * 1/2006 Duske, Jr. .......... H04B 7/18567
370/316
7,062,546 B1 * 6/2006 Kolar .................. H04L 41/0803
709/220

(Continued)

FOREIGN PATENT DOCUMENTS

EP  2109254 A1 * 10/2009 ........... H04L 41/082
EP  2109254 A1   10/2009

OTHER PUBLICATIONS

Droms, "Dynamic Host Configuration Protocol", RFC 2131, 1997 (Year: 1997).*

(Continued)

*Primary Examiner* — Ondrej C Vostal
(74) *Attorney, Agent, or Firm* — Nolte Intellectual Property Law Group

(57) ABSTRACT

A network configuration development environment including an insights enabled editor is disclosed. In particular, this disclosure is related to an editor that provides just-in-time information in an insights area to assist a network developer to configure parameter settings for one or more network devices. In one example, attributes of a switch are the area of focus of a current edit session, and, based on this area of focus, the insights editor may query the switch to obtain current information. Information returned from the switch may be provided in an "insights area" visible to the user about to edit settings for that same switch. The disclosed insights editor represents part of an overall network configuration development environment that includes automated techniques to assist with network configuration, design and maintenance.

20 Claims, 11 Drawing Sheets

(51) Int. Cl.
*G06F 16/951* (2019.01)
*G06F 3/0482* (2013.01)

(56) References Cited

U.S. PATENT DOCUMENTS

| | | | |
|---|---|---|---|
| 7,130,870 B1 | 10/2006 | Pecina et al. | |
| 8,060,862 B2 | 11/2011 | Eldridge et al. | |
| 8,156,213 B1* | 4/2012 | Deng | H04L 41/084 709/223 |
| 8,248,958 B1* | 8/2012 | Tulasi | H04L 43/50 370/241 |
| 8,291,403 B2 | 10/2012 | Li et al. | |
| 8,589,531 B2 | 11/2013 | Mollitor | |
| 8,736,611 B1* | 5/2014 | Tulasi | G06T 11/206 345/440 |
| 8,938,489 B2 | 1/2015 | Suit et al. | |
| 9,088,491 B2 | 7/2015 | Vaidya et al. | |
| 9,094,299 B1* | 7/2015 | Rao D.S. | H04L 41/0813 |
| 9,170,926 B1 | 10/2015 | Cohen et al. | |
| 9,247,436 B2 | 1/2016 | Moore et al. | |
| 9,369,431 B1* | 6/2016 | Kirby | H04L 63/02 |
| 9,600,386 B1 | 3/2017 | Thai et al. | |
| 10,148,506 B1* | 12/2018 | Anburose | H04L 41/5006 |
| 2003/0208579 A1* | 11/2003 | Brady, Jr. | G06F 8/65 709/223 |
| 2004/0148367 A1* | 7/2004 | Takano | G06F 9/44505 709/220 |
| 2004/0221262 A1* | 11/2004 | Hampapuram | G06F 8/33 717/113 |
| 2005/0174994 A1* | 8/2005 | Park | H04L 41/082 370/352 |
| 2006/0206864 A1* | 9/2006 | Shenfield | G06F 8/20 717/107 |
| 2007/0168493 A1* | 7/2007 | Sarwono | G06F 11/006 709/224 |
| 2008/0101419 A1 | 5/2008 | Suriyanarayanan | |
| 2009/0276771 A1* | 11/2009 | Nickolov | G06F 9/4856 717/177 |
| 2011/0213480 A1* | 9/2011 | Zila | G06F 17/5004 700/98 |
| 2012/0209867 A1 | 8/2012 | Agarwal et al. | |
| 2013/0010626 A1 | 1/2013 | Turcanu et al. | |
| 2013/0166774 A1* | 6/2013 | Pruthi | H04L 41/5025 709/240 |
| 2013/0182712 A1 | 7/2013 | Aguayo et al. | |
| 2013/0254524 A1 | 9/2013 | Snapir et al. | |
| 2014/0280833 A1 | 9/2014 | Gao et al. | |
| 2015/0220426 A1 | 8/2015 | Spektor et al. | |
| 2016/0224910 A1 | 8/2016 | Deng et al. | |
| 2016/0291942 A1* | 10/2016 | Hutchison | G06F 8/451 |
| 2016/0344738 A1 | 11/2016 | Dotan et al. | |
| 2016/0344773 A1* | 11/2016 | Knjazihhin | G06F 16/148 |
| 2017/0054601 A1 | 2/2017 | Affoneh et al. | |
| 2017/0102833 A1 | 4/2017 | Kodali et al. | |
| 2017/0255866 A1* | 9/2017 | Lambe | G06N 5/046 |
| 2017/0272316 A1* | 9/2017 | Johnson | H04L 61/301 |
| 2017/0308391 A1 | 10/2017 | Nakanoya et al. | |
| 2018/0026834 A1* | 1/2018 | Dec | H04L 41/082 |
| 2018/0069752 A1* | 3/2018 | Igarashi | H04L 41/0803 |
| 2018/0131745 A1* | 5/2018 | Shakir | H04L 43/10 |
| 2018/0136931 A1* | 5/2018 | Hendrich | G06F 11/302 |
| 2019/0108041 A1* | 4/2019 | D'Ercoli | G06F 9/453 |

OTHER PUBLICATIONS

Enns, "NETCONF Configuration Protocol", RFC 4741, 2006 (Year: 2006).*
Enns et al., "Network Configuration Protocol (NETCONF)", RFC 6241, 2011 (Year: 2011).*
Kundrat et al., "YANG/NETCONF ROADM: Evolving Open DWDM Toward SDN Applications", 2018 (Year: 2018).*
Merriam-Webster, "augment", 2018 (Year: 2018).*
Huang, Z. et al., SAIC: Identifying Configuration Files for System Configuration Management, (Research Paper), Nov. 6, 2017, 17 Pgs.
Langemak, J., Streamlining Network Change Validation and Testing, (Web Page), Jun. 4, 2016, 9 Pgs.
Configuration Editor Tool (svcconfigeditor.exe), (Web Page), Mar. 30, 2017, 21 Pgs.
Pugdeethosapol, K. et al., "Dynamic Configuration of the Computing Nodes of the ALICE O2 System," IEEE, 2016, http://scholar.google.com/scholar_url?url=http%3A%2F%2Fcds.cern.ch%2Frecord%2F2039736%2Ffiles%2FSummer_Student_Report_Krittaphat.pdf&hl=en&sa=I&oi=gga&ct=gga&cd=0&d=566094908024213056&ei=PwIDXcg2OcWlygTioomoAw&scisig=AAGBfm0DcCdCvFlzPx-0O4P68YeHCa3ymg&nossl=1&ws=1203x900&at=Dynamic%20configuration%20of%20the%20computing%20nodes%20of%20the%20ALICE%20O2%20system.

* cited by examiner

CONTEXT SENSITIVE COMMAND DOCUMENTATION

Using the CLI To Configure Ports

Interface   Status
Link Status : Up

You can configure one or more of the following port parameters. For details on each option, see Table 10-1 on page 10-4.

*Syntax:* [no] interface <[ethernet] port-list>
disable | enable
speed-duplex
<10-half | 100-half | 10-full | 100-full | 1000-full | auto | auto-10 | auto-100 | auto-1000 >
flow-control Note that in the above syntax, you can substitute an "*int*" for "*interface*" and an "*e*" for "*ethernet*", that is *int e <port-list>*.

```
interfacea1
  description Building 2, Floor 1 closet building 1
  ip  address 192.168.1.1 255.255.255.0
  no shutdown
interf┆             Right- click to pop up
  desc             documentation for the
  ip ad                   command
  no sh
interfacea3
  description Building 2, Floor 3 closet
  ip address 192.168.1.3 255.255.255.0
  no shutdown
```

FIGURE 5

Network management example:

1. Every switch must have an IP address on the 172.16.1.0 management subnet
interface vlan 1
ip address 172.16.1.A([0-9]|[1-9][0-9]|1[0-9]|2[0-4][0-9]|25[0-5]) 255.255.255.0
no shutdown
!
! and use the authorized management LAN default gateway
ip default-gateway 172.16.1.1

Regulatory example:

1. Every ... switch must display this message upon console access
banner motd $
-------------------------
UNAUTHORIZED ACCESS IS PROHIBITED
-------------------------
$ FIPS operating procedures example:

1. NIST FIPS 140 — 2 Security Policy for Aruba 2920 Switch Series
secure-mode enhanced
no telnet-server
ip ssh filetransfer
no tftp client
no tftp server
snmpv3 enable
no snmpv3 user initial
no snmp-server enable
snmpv3 only
no web-management plaintext
no web-management ssl
no front-panel-security factory-reset
no front-panel-security password-clear
no usb-port

AUTOMATED CONFORMANCE VALIDATION

FIGURE 8

Validation Results: 95% complete, PASS 15 of 19

| Result | Test | Reason(s) |
|---|---|---|
| FAIL | DHCP snooping edge ports | DHCP snooping disabled on 1/1/13 |
| FAIL | DHCP server reachability | DHCP server 23.0.0.5 is not reachable |
| FAIL | IP MTU consistency | IP MTU mismatch on vlan 10 |
| FAIL | Port tagging consistency | Tagging differs on port 1/1/4 |
| RUN | Spanning tree infrastruct... | |
| PASS | LAG consistency | |
| PASS | IP address/subnet consist... | |
| PASS | Route consistency | |
| PASS | Resource usage | |

FIGURE 9A

SYSTEM AND METHOD TO PROVIDE NETWORK INSIGHTS FOR CORRECT AND EFFICIENT NETWORK CONFIGURATION

RELATED APPLICATIONS

This application is related to U.S. patent application Ser. No. 15/193,824, entitled "System for Simultaneous Viewing and Editing of Multiple Network Device Configurations," by Charles F. Clark, et al., filed concurrently herewith, which is hereby incorporated by reference in its entirety for all applicable purposes. This application is also related to U.S. patent application Ser. No. 15/934,806, entitled, "System and Method for Validating Correctness of Changes to Network Device Configurations," by Charles F. Clark, et al., filed concurrently herewith, which is hereby incorporated by reference in its entirety for all applicable purposes.

BACKGROUND

Today's infrastructure networks are becoming more and more complicated and are including ever increasing numbers of devices with network capabilities. The Internet of Things ("IoT") growth represents one growth area that cause enterprise networks, for example, to include substantially more network connected devices as compared to their historical requirements. One side-effect of adding such a large volume of connected devices is that infrastructure networks (e.g., enterprise private networks) have become more complicated and may require additional network support devices such as routers, bridges, domain name servers, network time protocol ("NTP") servers, gateways, etc. Each of these network support devices (or simply "network devices") requires a configuration of network parameters in order to function as desired within the possibly complex network architecture. In some cases, initially setting or changing, the configuration of a network device may require additional insight so that a device setting is set to a proper value within the context of an overall network design. Incorrect or non-optimum settings may have unforeseen and unintended consequences to the stability, reliability, and performance of an enterprise infrastructure network or portion thereof (e.g., a subnet). This is, in part, because configuration of one network device may inadvertently affect the performance or connectivity of other devices in the network.

Prior art methods for determining how to configure a network largely rely upon expertise and knowledge of a network administrator. In some cases, network administrators simply use configuration settings they believe will work and hope for the best. In other cases, limited help information may be available in the form of reference manuals or user guides. Also, even if a network device is not properly configured, sometimes the network "appears" to be functioning properly. However, if a subtle error is introduced to a network without large scale impact, it may be days or weeks before someone discovers that a printer or other device is not functioning correctly. Loss of network connection by devices is just one of the possible consequences to an improperly configured network. In other cases, a slight performance degradation may occur and not be noticed until a much later point in time. The degradation resulting in poor or less than optimal productivity of the devices (and possibly workforce) reliant on the network infrastructure. In short, incorrect configuration settings for network devices may cause undesired network performance, or even network failure. Accordingly, care should be taken when setting or adjusting configuration parameters of network devices.

BRIEF DESCRIPTION OF THE DRAWINGS

For a detailed description of various examples, reference will now be made to the accompanying drawings, in which:

FIG. 5 is a screen shot showing one possible insight of context sensitive command documentation, according to one or more disclosed implementations;

FIG. 8 is a screen shot showing one possible insight automated conformance validation, according to one or more disclosed implementations; and FIGS. 9A-B are screen shots of possible validation results insights, according to one or more disclosed implementations.

DETAILED DESCRIPTION

Figure 1:
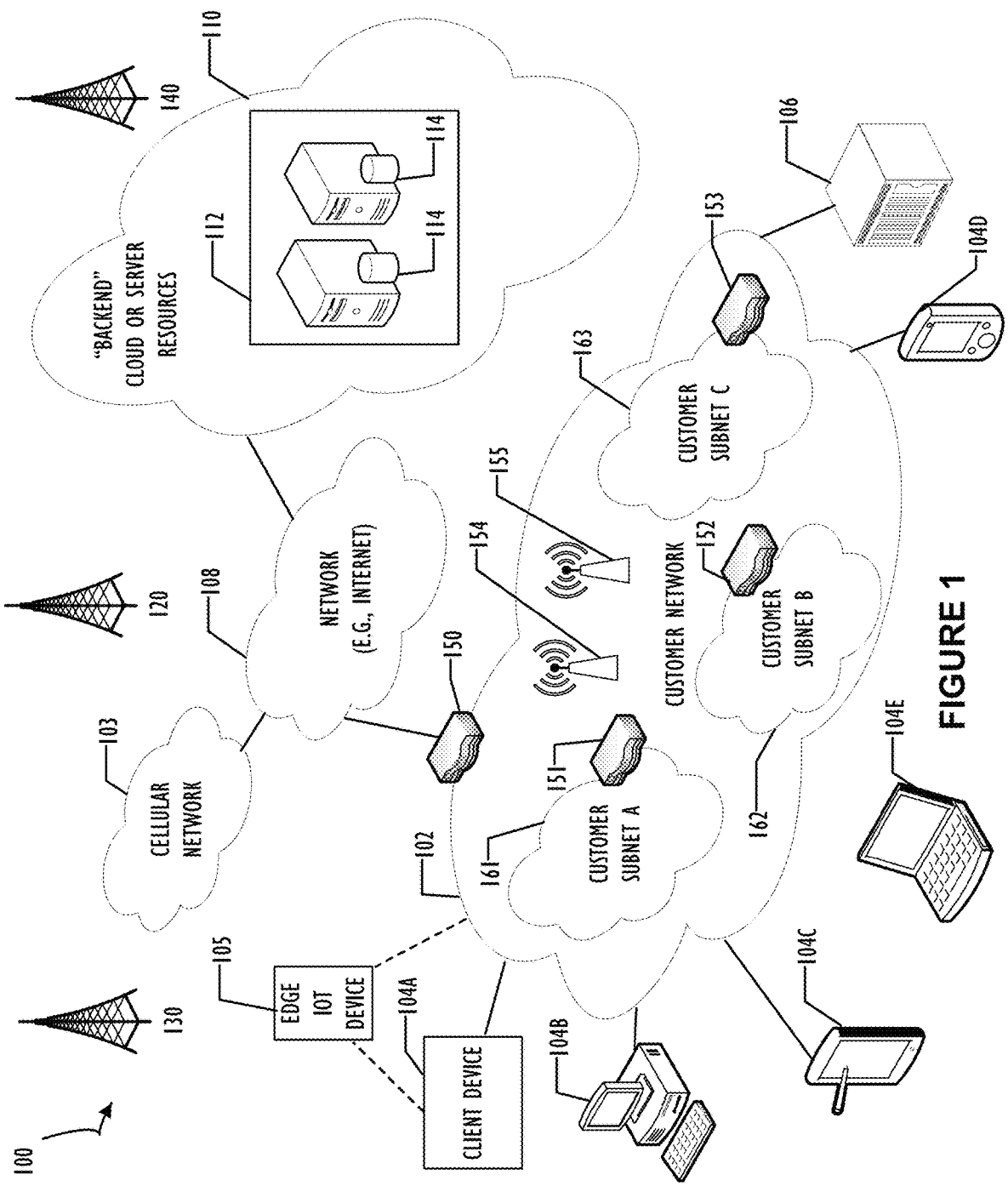
FIG. 1 is a block diagram representing an example of a networked computing infrastructure where implementations of the present disclosure may operate.

Computer networks are often complex distributed systems. Configuration of computer networks also may require tuning individual configuration items of each device in the network so that each device conforms to its role in this potentially complex distributed system. In some cases, the configuration needs to be consistent and in others the configuration needs to be complementary. Access to information and intelligent assistance when performing configuration actions may assist a system or network administrator to ensure correct configuration of the network devices.

This disclosure is directed to addressing the above-mentioned issues and other problems, in part, by providing a network configuration development environment to improve network stability, correctness, and efficiency. The network configuration development environment may be used as part of planned configuration change strategy for changes to network devices, or configuration and introduction of new devices to a network. The disclosed systems and methods may also be useful in ensuring conformance to standards (e.g., corporate security standards or industry required standards) and conformance to an overall network design architecture. For example, a corporation may have security standards reflecting which protocols are allowed to propagate through different portions of a network. Some subnets may have higher security standards, and thus need to be configured properly to not introduce a change that violates any appropriate security standard.

In particular, but not by way of limitation, this disclosure is related to an interface to assist in initially setting or changing network configuration parameters for network devices (e.g., routing commands, protocols supported, services addresses, etc.). The disclosed interface provides "insights" where applicable to assist network engineers and administrators in an efficient manner to support a network communication infrastructure. In one example, a system administrator configuring a network time protocol ("NTP") server address may be assisted with a pop-up of information relating to available NTP servers or may be provided an auto-fill suggestion for completing the address entry field. To continue this example, if a system administrator entered an incorrect address (e.g., valid address but not of an NTP server) that system administrator may be informed in near real-time so that appropriate corrections may be made prior to completing the configuration of the device in question. The insights editor may be implemented in conjunction with a multi-editor capability and interface as described in the U.S. patent application entitled, "System for Simultaneous Viewing and Editing of Multiple Network Device Configurations," by Charles F. Clark, incorporated by reference above.

To address issues related to prior art network configuration change techniques, this disclosure presents methods and systems to improve the complex technical art of network administration. In particular, the disclosed network development insights editor represents part of an overall network configuration development environment configured to provide expert help and enhanced validation (e.g., conformance to standards, and correctness) automatically for a network administrator.

In the following description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has been principally selected for readability and instructional purposes and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system. The term also may be used to refer to a number of such electronic computing devices in electronic communication with one another.

As used herein, the term "medium" refers to one or more non-transitory physical media that together store the contents described as being stored thereon. Examples may include non-volatile secondary storage, read-only memory (ROM), and/or random-access memory (RAM). Such media may be optical or magnetic.

As used herein, the terms "application" and "function" refer to one or more computing modules, programs, processes, workloads, threads and/or a set of computing instructions executed by a computing system. Example implementations of applications and functions include software modules, software objects, software instances and/or other types of executable code. Note, the use of the term "application instance" when used in the context of cloud computing refers to an instance within the cloud infrastructure for executing applications (e.g., for a customer in that customer's isolated instance).

As used herein, the term "Insights editor" refers to an editor or viewer style graphical interface capable of providing validation, parameter setting completion assistance, and expert help, among other things, for a system administrator interactively editing a network device configuration (See FIG. 5). The insights editor may be configured to show a side panel with insights information automatically updated to contain relevant information based on what section or portion of a configuration file a system administrator is currently editing. For example, based on where the cursor or pointer is located rather than simply based on what type of data is currently displayed for edit. In some implementations the insights editor may initiate additional functions (internal to itself or external processes) to update insights information or perform just-in-time validation of a parameter setting. For example, after the system administrator enters a value for a configuration parameter setting, the insights editor may initiate execution of functions to perform a validation on the value entered. Based on the validation, the insights editor may present additional information about the value just entered. Note, that these initiated functions may occur while the system administrator is actively editing the configuration (e.g., just-in-time) and not wait till the editing session is saved or exited.

Referring now to FIG. 1, networked computing infrastructure 100 is illustrated in a block diagram and represents an example in which implementations of the present disclosure may operate. For example, network devices such as switches, routers, gateways, and wireless access points may have their configuration changes validated using the disclosed network configuration development environment described below with reference to FIG. 3. Networked computing infrastructure 100 comprises a customer network 102, network 108, and a "backend" cloud or server resources platform/network 110. In one example, the customer network 102 may be a local private network, such as local area network ("LAN") that includes a variety of network devices that include, but are not limited to switches 150, 151, 152, and 153), servers, wireless access points ("WAPs") 154-155, and routers. Each of these networks can contain wired or wireless programmable devices and operate using any number of network protocols (e.g., TCP/IP) and connection technologies (e.g., WiFi® networks, Bluetooth®).

In another example, customer network 102 represents an enterprise network that could include or be communicatively coupled to one or more local area networks (LANs) that may be implemented as different subnets (e.g., subnet A 161, subnet B 162, and subnet C 153), virtual networks, data centers, and/or other remote networks (e.g., 108, 112). Because of the complexity of network configuration, it is possible that a configuration change to router 150 may have an adverse effect on devices behind router 152 that supports customer subnet B 162. That is, changes well outside a subnet may have adverse consequences to devices within a subnet. Accordingly, it may be desirable to utilize the disclosed automated development system to provide assistance via an Insights enabled editor when implementing any changes within customer network 102. Otherwise, a system administrator may not realize that a change to router 150 might create issues within subnet B 152 (or elsewhere in remote portions of a customer network). Determination of changes affecting remote portions of the network may be particularly problematic when the remote portions are logically, physically, or geographically distant from the change. For example, if router 150 and customer subnet B 162 are not in geographic proximity to each other, then a system administrator may not notice or be timely informed of errors introduced on subnet B when using ad hoc configuration change methods that are not automated and/or comprehensive.

As shown in FIG. 1, customer network 102 may be connected to one or more client devices 104A-E and allow the client devices to communicate with each other and/or with backend cloud or server resources platform/network 110 (e.g., via network 108). Client devices 104A-E may be computing systems such as desktop computer 104B, tablet computer 104C, mobile phone 104D, laptop computer 104E (shown as wireless), and/or other types of computing systems generically shown as client device 104A. Networked computing infrastructure 100 may also include other types of devices generally referred to as Internet of Things ("IoT") (e.g., edge IOT device 105) that may be configured to send and receive information via a network to access network services or interact with a remote web browser application (e.g., to receive configuration information).

FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and backend cloud or server resources platform/network 110. Local compute resource 106 may also facilitate communication between other external applications, data sources, and services, and customer network 102.

Networked computing infrastructure 100 also includes cellular network 103 for use with mobile communication devices. Mobile cellular networks support mobile phones and many other types of mobile devices such as laptops etc. Mobile devices in networked computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices, such as wireless access points 154, 155, and routers (e.g., local compute resource 106). In addition, the mobile devices may interact with other mobile devices or with non-mobile devices such as desktop computer 104B and various types of client devices 104A for desired services.

As illustrated in FIG. 1, customer network 102 may also include a dedicated network device 150 (e.g., gateway or router) or a combination of network devices 150, 151, 152, and 153, that implement a customer firewall or intrusion protection system. Note that network device 150 may provide one or more of these capabilities for network 102, while network devices 151, 152, and 153 may provide one or more of these capabilities for their respective subnet (161, 162, and 163). Of course, one or more network devices may work together to provide specific security requirements as needed for different portions (e.g., subnets) of a network.

FIG. 1 illustrates that customer network 102 is coupled to a network 108. Network 108 may include one or more computing networks available today, such as other LANs, wide area networks ("WANs"), the Internet, and/or other remote networks, in order to transfer data between client devices 104A-E and backend cloud or server resources platform/network 110. Each of the computing networks within network 108 may contain wired and/or wireless programmable devices that operate in the electrical and/or optical domain. For example, network 108 may include wireless networks, such as cellular networks in addition to cellular network 103.

Wireless networks may utilize a variety of protocols and communication techniques (e.g., Global System for Mobile Communications ("GSM") based cellular network) wireless fidelity Wi-Fi networks, Bluetooth, Near Field Communication ("NFC"), and/or other suitable radio-based networks as would be appreciated by one of ordinary skill in the art upon viewing this disclosure. Network 108 may also employ any number of network communication protocols, such as Transmission Control Protocol ("TCP") and Internet Protocol ("IP"). Although not explicitly shown in FIG. 1, network 108 may include a variety of network devices, such as servers, routers, network switches, and/or other network hardware devices configured to transport data over networks. Any, or all of these devices may be adversely affected by a change to a network configuration that is not performed properly.

In FIG. 1, backend cloud or server resources platform/network 110 is illustrated as a remote network (e.g., a cloud network) that is able to communicate with client devices 104A-E via customer network 102 and network 108. Backend cloud or server resources platform/network 110 could alternatively be implemented using systems that are part of customer network 102 (i.e., dedicated customer server resources). However, when implemented using a cloud infrastructure as shown, backend cloud or server resources platform/network 110 acts as a platform that provides additional computing resources to the client devices 104A-E and/or customer network 102.

For example, by utilizing backend cloud or server resources platform/network 110, users of client devices 104A-E may be able to build and execute applications, such as automated processes for various enterprise, IT, and/or other organization-related functions. In one example, backend cloud or server resources platform/network 110 includes one or more data centers 112, where each data center server instance 114 could correspond to a different geographic location. Each data center server instance 114 may be implemented on a physical computing system, such as a single electronic computing device (e.g., a single physical hardware server) or could be in the form a multi-computing device (e.g., multiple physical hardware servers). Examples of data center server instances 114 include, but are not limited to, a web server instance (e.g., a unitary Apache installation), an application server instance (e.g., unitary Java Virtual Machine), and/or a database server instance (e.g., a unitary MySQL catalog).

As is illustrated in FIG. 1, networked computing infrastructure 100 may contain many different network devices that may each require configurations to allow the network(s) as a whole to function properly. Each of these network devices may be maintained and configured using the disclosed network configuration development environment. Further, the disclosed network configuration development environment may also execute on various portions of networked computing infrastructure 100. Given the complexity and number of different protocols and devices shown in networked computing infrastructure 100, it should be apparent that the disclosed network development environment may provide benefits and improvements for the network administrator.

Figure 2:
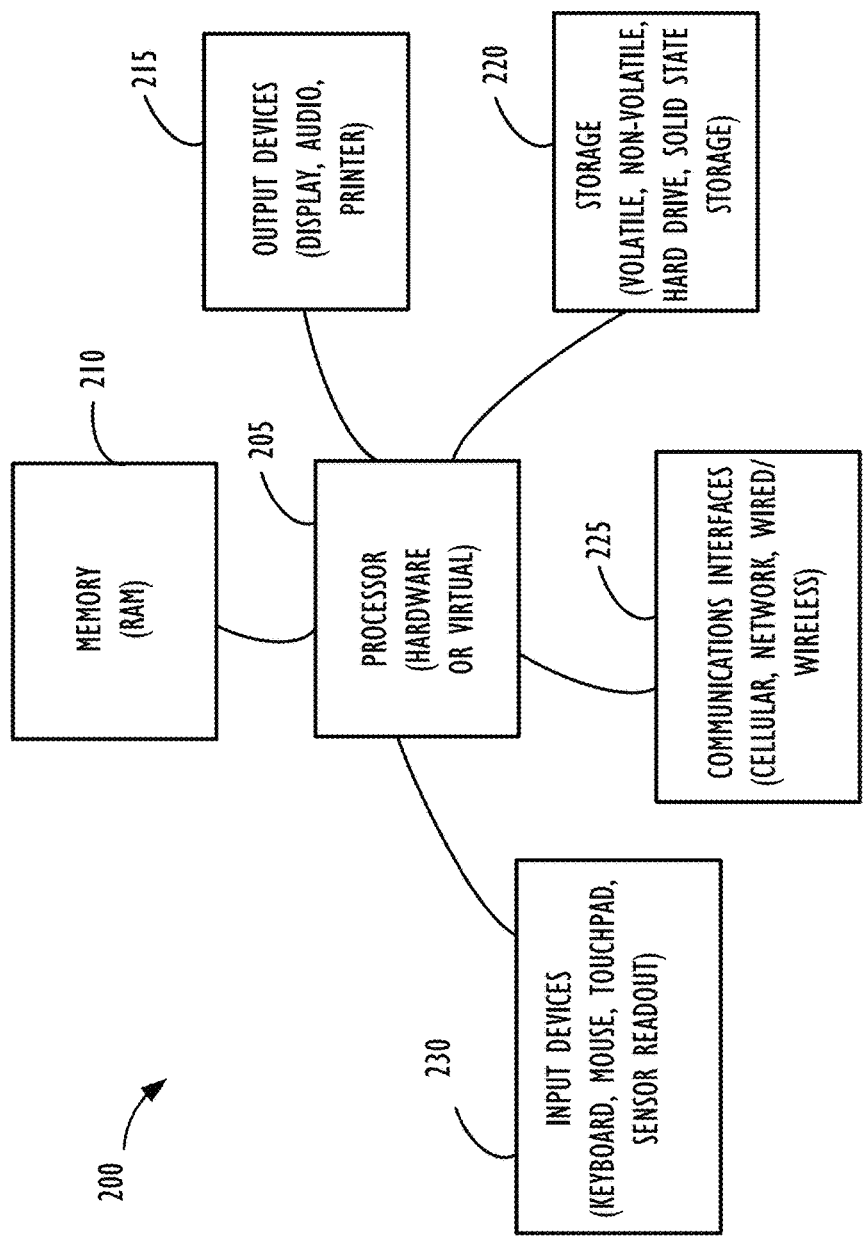
FIG. 2 is high-level block diagram of a computing device that may be configured to perform one or more disclosed methods or processes.

FIG. 2 illustrates a high-level block diagram of a computing device 200 (e.g., computing system or network device as shown in FIG. 1) that may be used to implement one or more disclosed examples (e.g., an insights editor as part of a network configuration development environment and the network devices it supports). For example, computing device 200, illustrated in FIG. 2, could represent a client device or a physical server device from network infrastructure 100 and could include either hardware or virtual processor(s) depending on the level of abstraction of the computing device. In some instances (without abstraction) computing device 200 and its elements as shown in FIG. 2 each relate to physical hardware. Alternatively, in some instances one, more, or all of the elements could be implemented using emulators or virtual machines as levels of abstraction. In any case, no matter how many levels of abstraction away from the physical hardware, computing device 200 at its lowest level may be implemented on physical hardware.

As also shown in FIG. 2, computing device 200 may include one or more input devices 230, such as a keyboard, mouse, touchpad, or sensor readout (e.g., biometric scanner) and one or more output devices 215, such as displays, speakers for audio, or printers. Some devices may be configured as input/output devices also (e.g., a network interface or touchscreen display). Computing device 200 may also include communications interfaces 225, such as a network communication unit that could include a wired communication component and/or a wireless communications component, which may be communicatively coupled to processor 205. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication ("PLC"), Wi-Fi, cellular, and/or other communication methods.

As illustrated in FIG. 2, computing device 200 includes a processing element, such as processor 205, that contains one or more hardware processors, where each hardware processor may have a single or multiple processor cores. In one example, the processor 205 may include at least one shared cache that stores data (e.g., computing instructions) that are utilized by one or more other components of processor 205. For example, the shared cache may be a locally cached data stored in a memory for faster access by components of the processing elements that make up processor 205. In some cases, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 2, the processing elements that make up processor 205 may also include one or more other types of hardware processing components, such as graphics processing units (GPUs), application specific integrated circuits (ASICs), field-programmable gate arrays (FPGAs), and/or digital signal processors (DSPs).

FIG. 2 illustrates that memory 210 may be operatively and communicatively coupled to processor 205. Memory 210 may be a non-transitory medium configured to store various types of data. For example, memory 210 may include one or more storage devices 220 that comprise a non-volatile storage device and/or volatile memory. Volatile memory, such as random access memory (RAM), can be any suitable non-permanent storage device. The non-volatile storage devices 220 can include one or more disk drives, optical drives, solid-state drives (SSDs), tap drives, flash memory, read-only memory (ROM), and/or any other type memory designed to maintain data for a duration time after a power loss or shut down operation. In certain instances, the non-volatile storage devices 220 may be used to store overflow data if allocated RAM is not large enough to hold all working data. The non-volatile storage devices 220 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 205. In one instance, the compiling process of the software program may transform program code written in a programming language to another computer language such that the processor 205 is able to execute the programming code. For example, the compiling process of the software program may generate an executable program that provides encoded instructions (e.g., machine code instructions) for processor 205 to accomplish specific, non-generic, particular computing functions.

After the compiling process, the encoded instructions may then be loaded as computer executable instructions or process steps to processor 205 from storage 220, from memory 210, and/or embedded within processor 205 (e.g., via a cache or on-board ROM). Processor 205 may be configured to execute the stored instructions or process steps in order to perform instructions or process steps to transform the computing device into a non-generic, particular, specially programmed machine or apparatus. Stored data, e.g., data stored by a storage device 220, may be accessed by processor 205 during the execution of computer executable instructions or process steps to instruct one or more components within the computing device 200.

A user interface (e.g., output devices 215 and input devices 230) can include a display, positional input device (such as a mouse, touchpad, touchscreen, or the like), keyboard, or other forms of user input and output devices. The user interface components may be communicatively coupled to processor 205. When the output device is or includes a display, the display can be implemented in various ways, including by a liquid crystal display ("LCD") or a cathode-ray tube ("CRT") or light emitting diode ("LED") display, such as an organic light emitting diode ("OLED") display. Persons of ordinary skill in the art are aware that the computing device 200 may comprise other components well known in the art, such as sensors, powers sources, and/or analog-to-digital converters, not explicitly shown in FIG. 2.

As mentioned above, the disclosed insights editor may provide just-in-time assistance to a system administrator when editing network configuration parameters for network devices within a network configuration domain. The assistance may be obtained from multiple internal and external sources. For example, some implementations of an insights editor may obtain data from one or more of: information about the device being updated (e.g., current neighbors, route table, number of access control lists (# ACLs) in use, names of ACLs configured but not applied, etc.); corporate standards; industry standards; design documentation; information from and about neighboring devices (e.g., interface configuration of neighbor, VLAN membership, IP subnets, MTU, etc.); the set of all known network devices within the network configuration domain (e.g., all RADIUS servers configured on any 802.1 switch, all IP's used on VLAN 10, all VRF's names); systems that use or provide services on the network (e.g., a VoIP server and the list of TCP ports it is using for voice and video communication); time series data (for example by applying machine learning and other expert techniques to time series data to detect appropriate ranges for parameters of configuration; just-in-time validation commands; and a simulation of the network (e.g., which switch will have the winning STP priority to become Root bridge. What would the winning value need to be to take over Root bridge. Similar for OSPF elections etc.).

Of course, information from each available source may be weighted with respect to each other, for expected reliability, or based on other possible criteria, such that information from some sources may be given higher priority than data from other sources. In cases where information is in conflict, data from higher priority sources may be used and the conflicting data may be ignored. Alternatively, the conflicting information may initiate an alert or pop up dialog, to inform the network administrator of different potential concerns.

A configuration insights augmentation to an editor represents an intelligent collection and presentation of information that a network administrator may use to ensure alignment (consistent/complimentary) and correctness of configuration parameter settings for network devices. In some example implementations, while editing candidate configurations (e.g., configurations that have not yet been deployed to a device) for a set of network devices, the network administrator may use the disclosed insights editor to audit and change those candidate devices configurations. With configuration insights, an editor may be augmented to display context sensitive information for each configuration item as it is viewed and changed.

For example, when configuring the NTP server IP address that the network devices should use (when the user has moved their cursor in the editor to the line for NTP server configuration) an insights panel may be configured to display the list of NTP server's IP addresses used in other network device configurations of a network configuration domain. The insights editor may also display the result of an attempt to communicate with the currently configured NTP server IP address. In this example, this insight may enable the administrator to verify consistency (they are using the same NTP server across their network) and correctness (the IP address is accessible on the network and it is an NTP server). As used in this context, an insight represents an augmented assistance provided from an insight enabled editor (e.g., the disclosed "insights editor").

Another example is, when the cursor is on a line that contains "router ospf 1 vrf default", the insights editor may then provide an insight (e.g., put information in the insights panel) to display all virtual router instances (VRFs); all open shortest path first (OSPF) routers in VRF default; all OSPF areas in use; and the OSPF interfaces on the switch. This provides information to a network administrator that may be necessary to correctly configure the routing on the network device for which they are editing configuration information.

Network device configurations may be complex and include many configuration items for each device. In some devices there may be parameters to set that are not common across all devices and a system administrator may not be already familiar with all possible configuration values. In this case, an insights editor may aid by automatically providing information about available settings and information about how this device must be configured such that the configuration does not violate design criteria, security requirements, or corporate guidelines, for example. As mentioned, there may be many different kinds of parameter settings for network devices, including but not limited to: management security (e.g., administrator account names, passwords, and roles; authentication servers IP addresses; etc.); physical layer configuration (e.g., physical interface speed and duplex settings; etc.); bridging and routing protocol settings (e.g., spanning tree device and port priorities; routing areas and keys; etc.); network access control policies (e.g., traffic allowed and denied on the network; clients allowed or denied access to the network; etc.); traffic routing policies (e.g., preferential routes for network traffic; etc.); power over Ethernet configuration (e.g., ports to be powered; amount of power available on a port; etc.); network monitoring (e.g., server to send log messages; server to send traffic samples and statistics for monitoring, etc.); and other features.

In addition to traditional help information sources, an insights editor may be configured to provide non-traditional information. For example, for each of the configuration items listed above, the insights editor may make use of both live and archived network device state and configuration to present relevant network content to network administrator when auditing or changing device configurations. In some implementations, time-series data may be used to assist with parameter settings. For example, if a system administrator attempting to set a rate limit on some class of traffic using the insights editor, the insights editor may determine that it could display an appropriate insight. In this example, the insights editor might show a historical graph or maybe show a max, min and average of values of historical data. If the system administrator was about to set the rate limit to 6,000 and the graph or min/max information indicated that the rate is very often (or at least has been) 10,000, then the system administrator may change their mind because they don't want to cause a problem by limiting a rate below what it historically has been reaching. Alternatively, if the graph and min/max data showed that 6,000 was outside of historical activity, then 6,000 may be a good setting. In this manner, time series data and even machine learning based on time series data may be used by an insights editor.

Insights editor capability represents an improvement to the art of network configuration and administration by providing an intuitive and concise presentation that enables a network administrator to see information pertinent to help with their task at hand (e.g., configuring a particular network device). The similarities and differences of the proposed candidate configuration may be compared across multiple devices and devices in different network segments before being placed in production. Further, the validation provided by an insights editor may include fully automated portions such that the validation may be performed just-in-time during an editing session.

Figure 3:
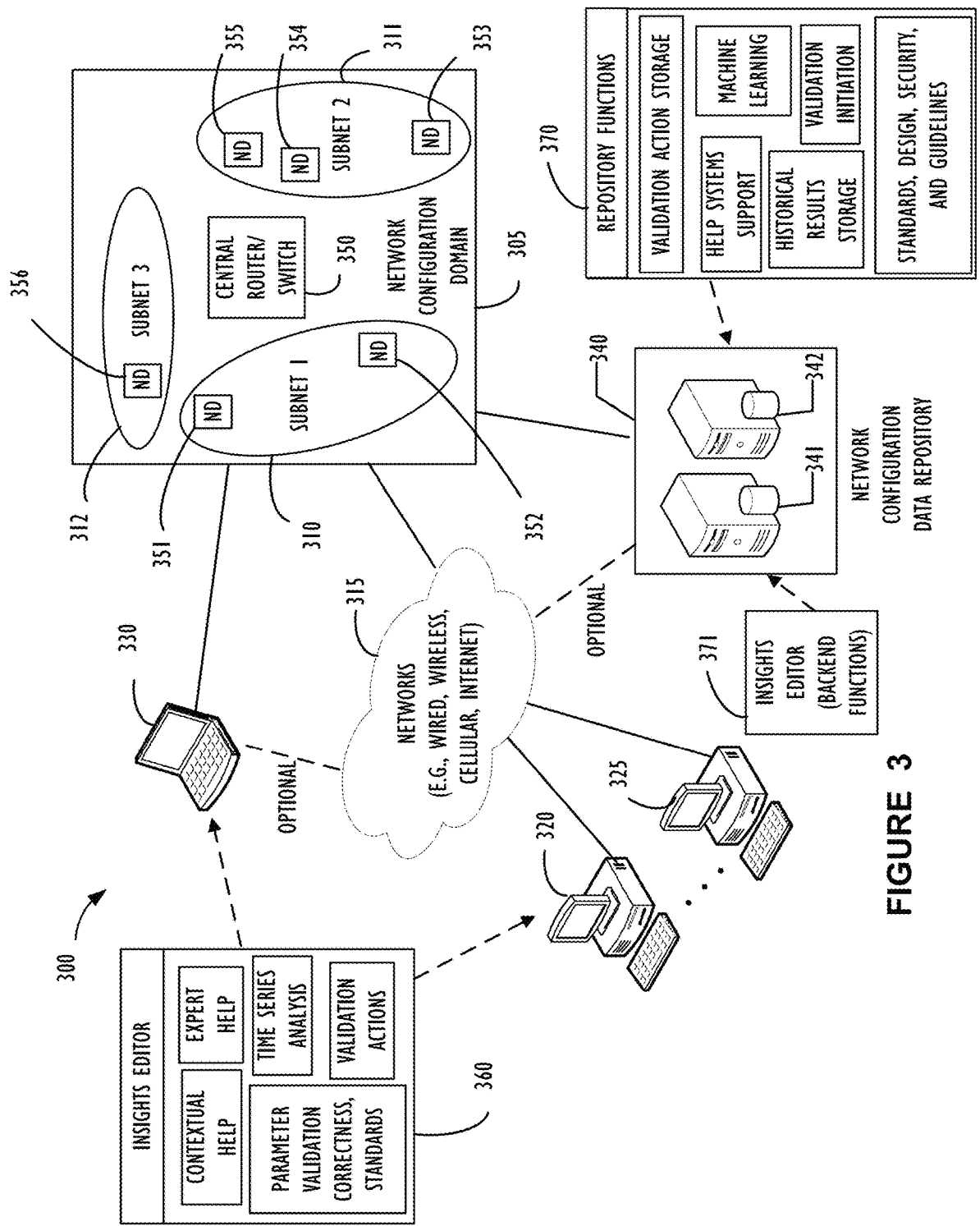
FIG. 3 is block diagram of multiple developer's endpoints connected through a network to a backend processing system configured to support an insights editing environment, according to one or more disclosed implementations.

Referring now to FIG. 3, block diagram 300 illustrates multiple computers that may serve as network administrator (or developer) endpoints (e.g., computers 320-325, and 330) connected through at least one network to a backend processing system (e.g., network configuration data repository 340) configured to support a network configuration development environment, according to one or more disclosed implementations. Each network administrator endpoint may facilitate execution of the disclosed insights editor 360 for working within a network configuration development environment.

Block 360 indicates that insights editor functions may include, but are not limited to, contextual help, expert help, time series analysis, validation actions (e.g., just-in-time validation command execution), and parameter validation against standards. In general insights editor 360 may be presented as a graphical user interface front-end to an application executing locally or to a remotely executing application and may, in some cases, be provided via a web interface (e.g., web browser or web application). Some of the functions outlined (e.g., time series analysis against historical results storage) may be performed as part of repository functions 370, by validation viewer interface 360, or by both depending on implementation criteria (e.g., performance, data availability, and security requirements). Insights editor 371 may include backend functions that execute alongside repository functions 370 and be connected via a local graphical user interface. Alternatively, the disclosed insights editor capability may be implemented as a distributed application with functions executing on different processors across a network configuration domain. In some implementations, functions are distributed across a network configuration domain based on performance, security, or convenience reasons and these distributed functions collectively provide the insights editor capability disclosed herein.

In the example of FIG. 3, network configuration data repository 340 is configured to use servers 341 and 342 to maintain data to support a network configuration development environment for network configuration domain 305. Servers 341 and 342 may be configured to maintain data representative of network configuration validation and test results as well as validation actions (e.g., just-in-time validation commands) corresponding to individual network devices or possible network device configuration settings within network configuration domain 305. In one example implementation, attributes may be stored within a relational data base (not shown) such that data may be extracted in a manner to support a proper association with corresponding individual network devices. Block 370 indicates that functions performed by network configuration data repository 340 include, but are not limited to, validation action storage; help systems support; historical results storage (e.g., time-series data); validation initiation criteria. (e.g., username/password information); machine learning tools; and standards (e.g., industry and corporate), design information (e.g., network, design requirements), security requirements, and other guidelines. Each of these aspects will be discussed in more detail below.

Continuing with FIG. 3, networks 315 represent optional communication networks that are not considered part of network configuration domain 305 but may allow for system administrators to interact with network configuration data repository 340 from remote locations or even mobile devices (e.g., laptop 330, or a mobile smart phone).

In the example of FIG. 3, network configuration domain 305 represents an enterprise network (e.g., similar to customer network 102 from FIG. 1) that may be maintained by one or more system administrators. In this example, the one or more system administrators may use the disclosed insights editor 360 (executing on, for example, computers 320-325, or 330) to interact with network configuration data repository 340. For example, to change configuration of or to monitor status of networks devices (351-356) in network configuration domain 305. As shown, network configuration domain 305 includes a central router/switch 350, and three subnets (i.e., subnet 1 310, subnet 2 311, and subnet 3 356). A total of seven network devices (i.e., ND 351, ND 352, ND 353, ND 354, ND 355; ND 356, and central-router/switch 350) are shown in network configuration domain 305.

Note that, in practice, there may hundreds or even thousands of network devices within an actual network configuration domain of a large corporation or enterprise, but for simplicity only seven are shown here. In modern enterprise networks, most network devices are dedicated switches, routers, or bridges, however, server computers may be configured to perform functions of a network device and may be used in that manner by smaller entities. The concepts of this disclosure are not limited to dedicated network devices and may work advantageously with any existing device configured to support networking functions.

Control of which validation actions are, performed on which devices may be maintained Within network configuration data repository 340. Initiation of validation actions may be performed by invoking repository functions 370, that in turn, cause local commands to execute on applicable devices. For example, a system administrator using insights editor 360 may request (or automatically cause) collection of metrics associated with a set of network devices. The output of this collection may be stored in network configuration data repository 340 as a record of the network operational state or configuration of certain devices before a planned configuration change (e.g., the one currently being entered via insights editor 360). Simple network management protocol ("SNMP") may also be used to collect information from certain devices.

The validation action results and insight information may be collected from many different data sources, including wired or non-wired network systems such as wireless network controllers, dynamic host configuration protocol ("DHCP"), and domain name services ("DNS"), business application servers, critical clients, or IoT devices, etc. The choice of devices and systems for information collection may be enterprise business specific and may be customized and controlled by information in network configuration data repository 340 as needed.

In some cases, the information collected at an instant in time may be different than expected given the natural variations in network operation. For example, the number of packets entering and leaving a network switch would vary based on network client activity. The insights editor 360 may consider temporary variations and provide insights information regarding this potentially temporary condition only if it deviated from the normal envelop of operation (e.g., as defined by a threshold). The envelope, or baseline profile, of normal operation may be learned from a time-series database of network configuration data repository 340. For example, test actions may be run periodically (or at varying times) to collect metrics to indicate the network and device information so that it is collected and maintained for future comparison (or machine learning). Network data repository 340 may also contain validation action initiation criteria that may include records for each device and system, including its name, network address, type of device or system, and credentials necessary to execute commands.

Figure 4A:
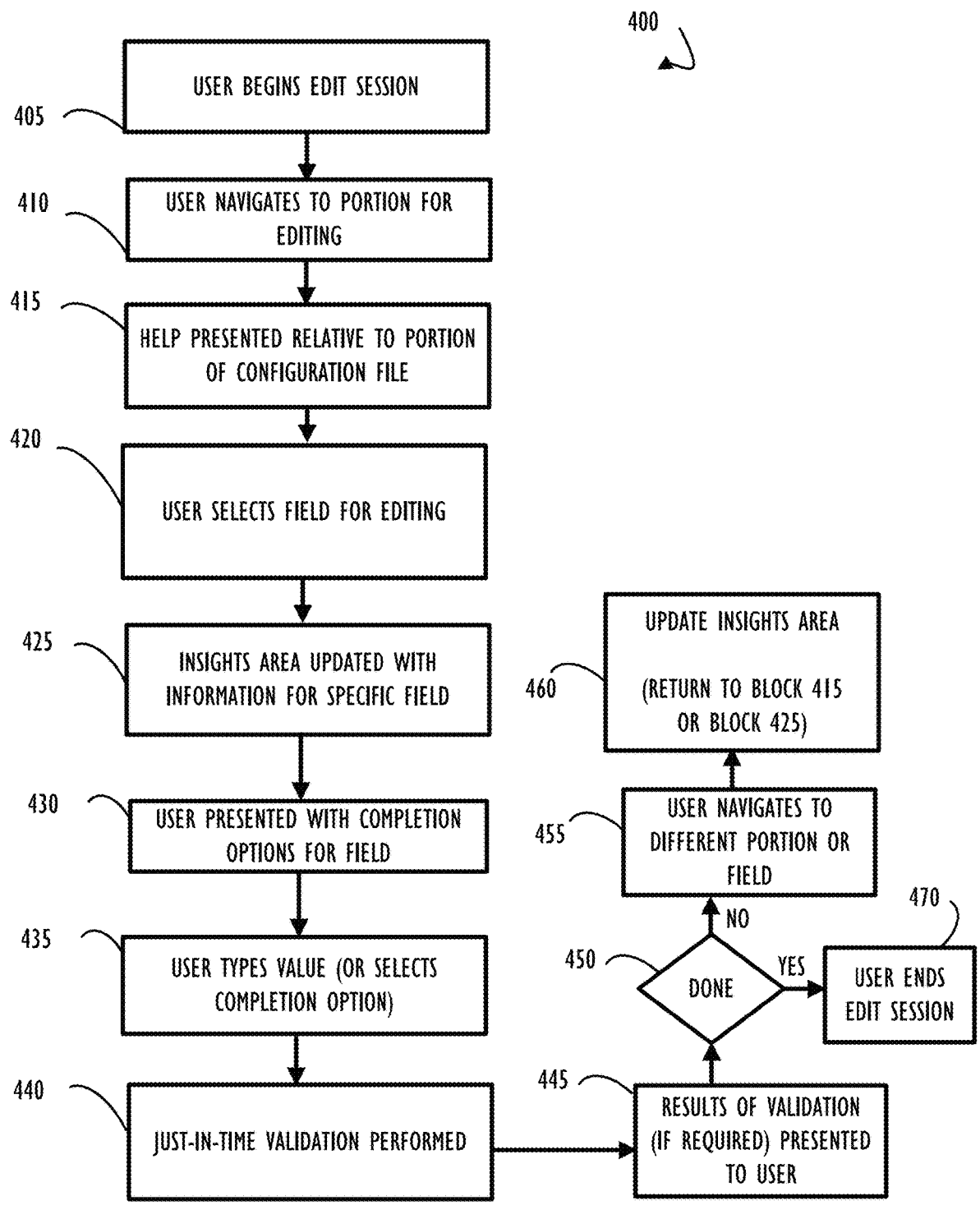
FIGS. 4A-B are flow charts of processes representing possible methods of providing insights in an editing session, according to one or more disclosed implementations.

Referring now to FIG. 4A, process 400 is illustrated in flow chart form and represents one possible method of obtaining and presenting insights information, for example as part of insights editor 360 or 371, according to one or more disclosed implementations. Beginning at block 405, an edit session for an insights editor may be initiated. Block 410 indicates that a user navigates a "point of focus" using a pointing device or cursor (e.g., repositions a mouse pointer, or touches a touch screen) on an editing window to point at a configuration file. For example, the editing window is presented such that it displays information from one or more network devices and possibly configuration parameters.

Figure 6:
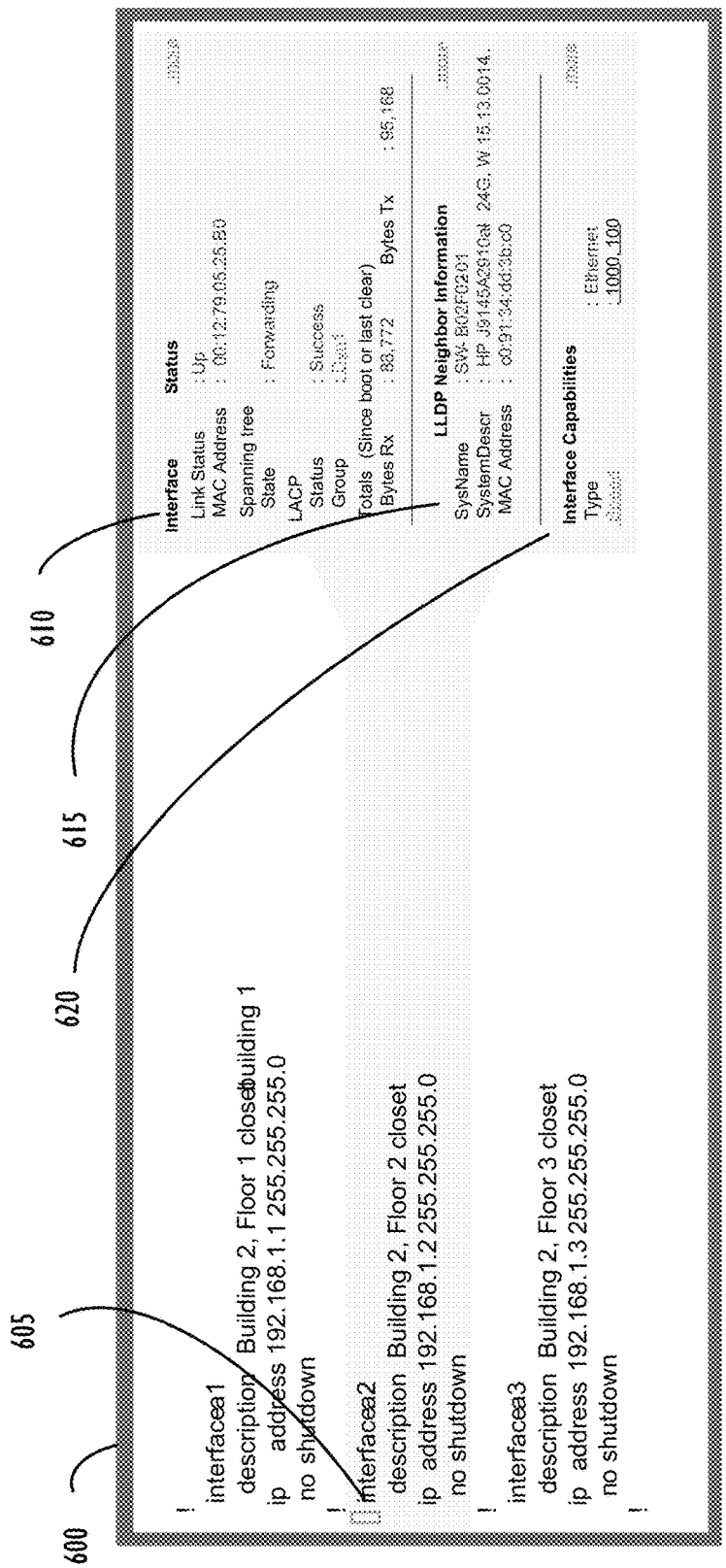
FIG. 6 is a screen shot showing one possible insight of real-time intelligent contextual information, according to one or more disclosed implementations.
Figure 7:
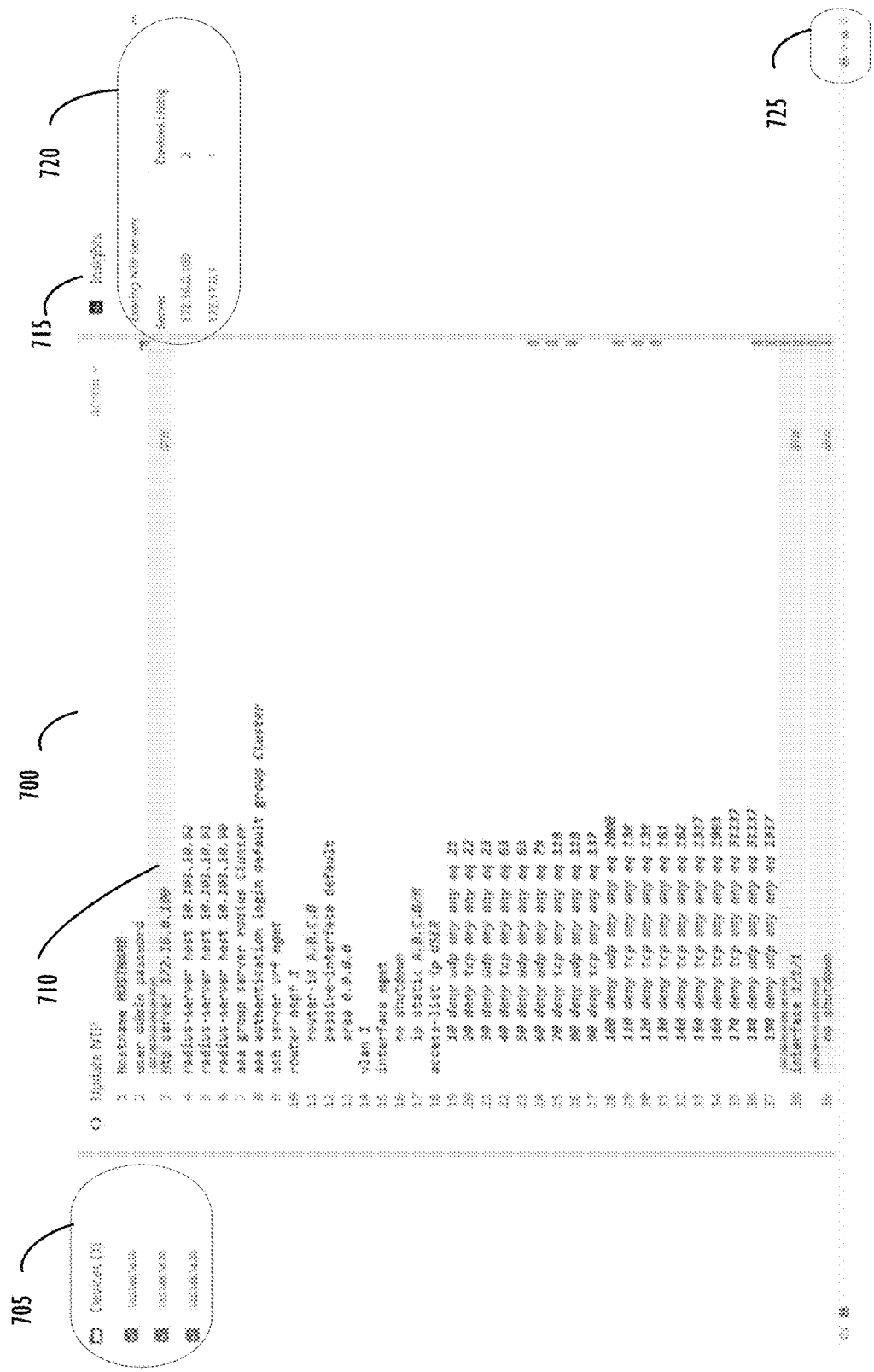
FIG. 7 is a screen shot showing one possible insight of augmented configuration parameter editing, according to one or more disclosed implementations.
Figure 9B:
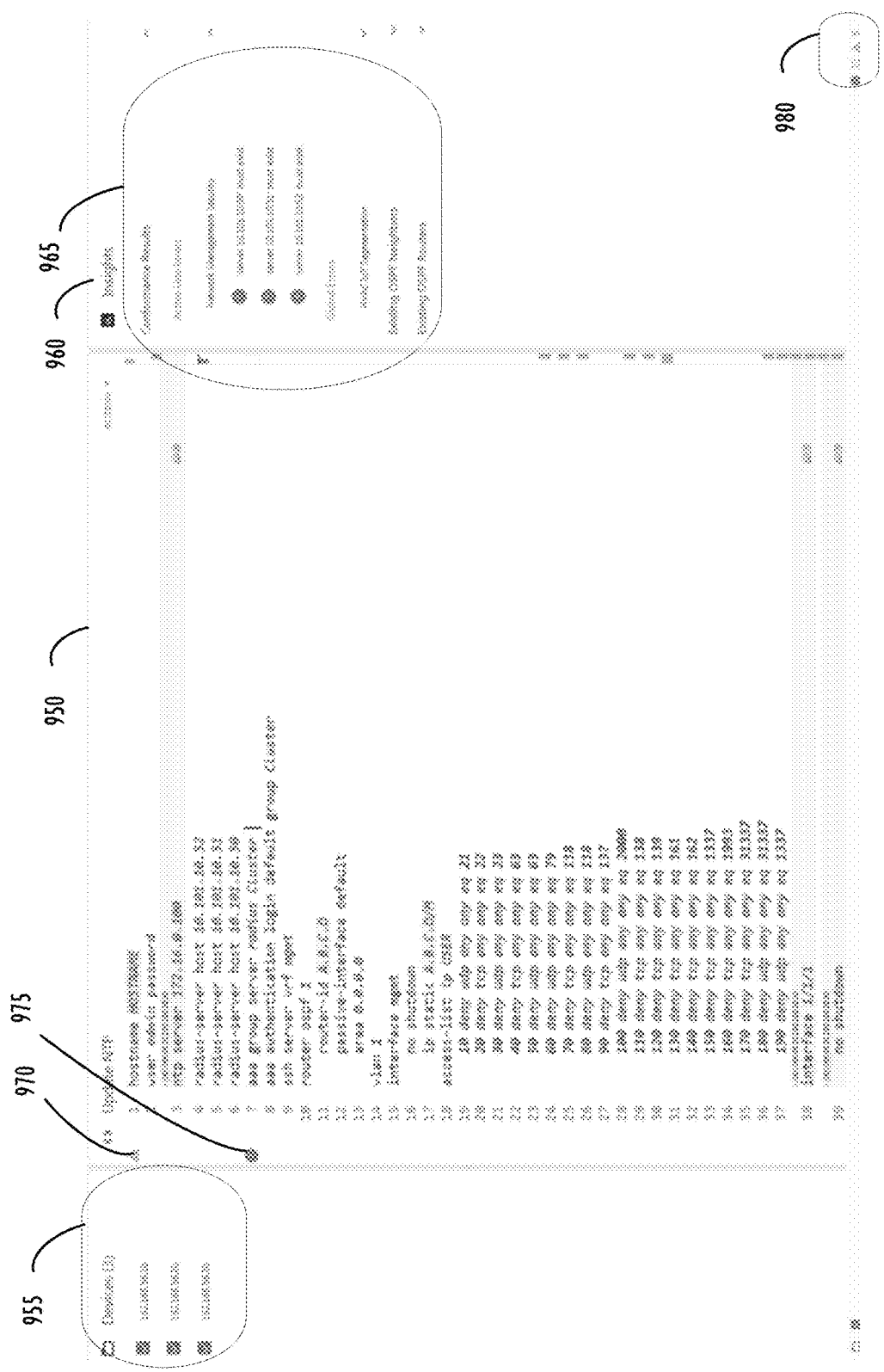

Block 415 indicates, that based on the navigation action, help may be presented (e.g., an insight) relative to the portion of the file under the point of focus. Block 420 indicates that a user selects a field for editing (e.g., starts to enter information fora particular field). Block 425 indicates, that as a response to a user selecting the field, an insights area (e.g., a panel to the right as shown in FIGS. 6-7, and 9B) may be updated with information pertaining to that specific field. Block 430 indicates may be presented with completion options for the field being edited. Block 435 indicates that a user may continue to type a value or may select an available completion option to fill out the field's value automatically. For example, possible values may be presented in an insights area or an auto-fill option may be presented via the insights editor.

Block 440 indicates that a just-in-time validation may be performed. A just-in-time validation represents a validation that is performed on this device, or possibly on a remote device, based on an initiation request sent from the insights editor. In one implementation, an insights editor 360 may communicate with a repository function 370 on a network configuration data repository 340 to request the validation action be initiated. Other types of validation may also be performed concurrently with any remote just-in-time validation actions. Block, 445 indicates that the results of validation, if required, may be presented to the user. For example, if validation is successful there may be no reason to provide feedback to the user. However, if validation fails, the user may be informed such that proper corrective action may be taken (e.g., prior to saving information from the edit session or prior to ending the edit session).

Decision 450 determines if the user has completed the edit session. If not, the NO prong of decision 450, flow continues to block 455 where the user may navigate to a different portion or field. Block 460 indicates that as a result of the navigation (similar to block 410) the insights area may be updated. Flow may then repeat from block 415 or 425 as appropriate. However, if decision 450 indicates the user has completed the edit session, the YES prong of decision 450, flow continues to block 470 where the edit session may be ended. In this manner a user may be presented with applicable insights that may be pertinent to exactly what the user is editing or getting ready to edit.

Figure 4B:
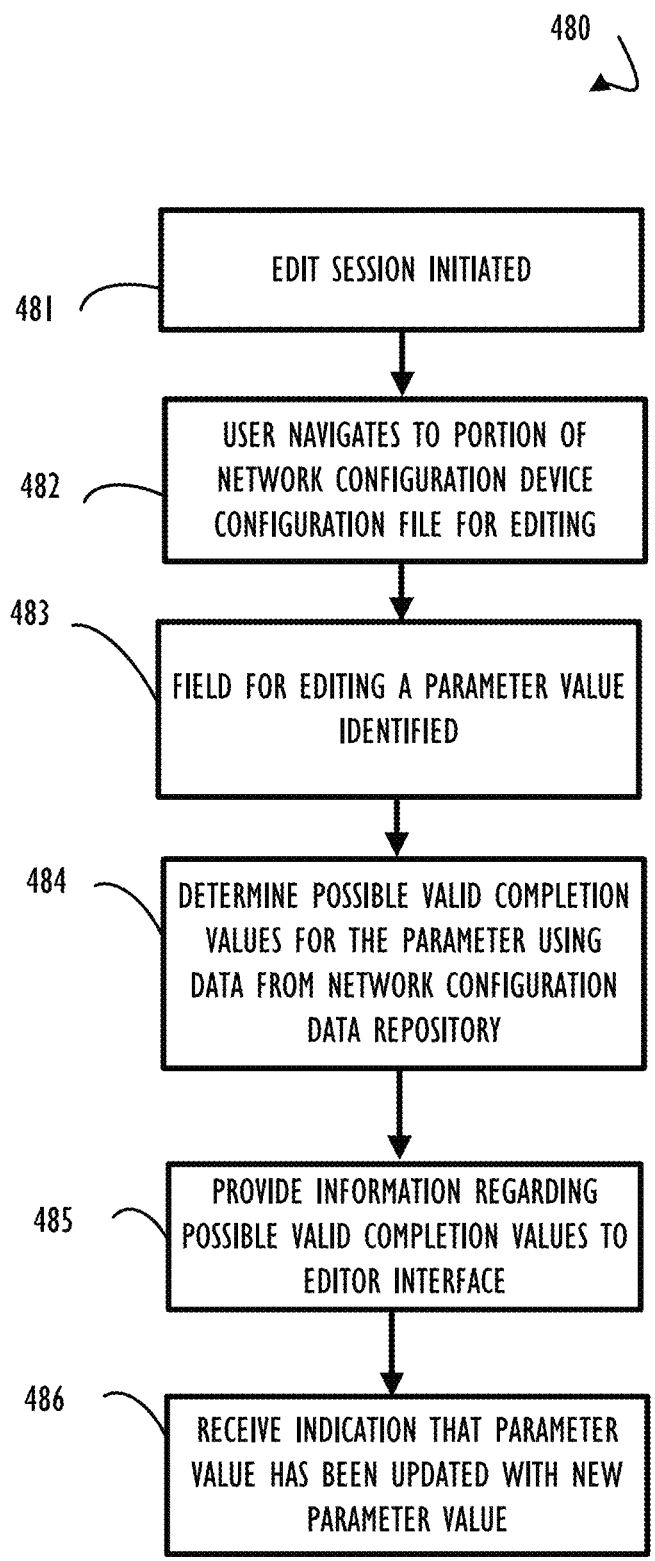

Referring now to FIG. 4B, process 480 is illustrated in flow chart form and represents a second possible method of obtaining and presenting insights information, for example as part of insights editor 360 or 371, according to one or more disclosed implementations. Beginning at block 481, an edit session is initiated. Block 482 indicates that the user navigates to a portion of a network device configuration file for editing. Block 483 indicates that a field fore editing a parameter value is identified. Block 484 indicates that a determination may be made for possible valid completion values for the parameter using data from a network configuration data repository (e.g., network configuration data repository 340). Block 485 indicates that information regarding the determined possible valid completion values may be provided to the editor interface. For example, provided from repository functions 370 to insights editor backend functions 371 and then to insights editor 360. Block 486 indicates that an indication that an updated parameter value has been entered and represents a new parameter value may be received, for example, at insights editor backend functions 371. In this manner, a backend support function may interact and communicate with a remote front end for one possible implementation of an insights, editor 360.

FIG. 5 illustrates a screen shot showing an example of one possible graphical user interface display for insights editor 360 with one possible insight of context sensitive command documentation, according to one or more disclosed implementations. Development window 500, in this example, shows information about a set of interfaces. Selection box 505 is configured such that a right-click on that box causes command line interface ("CLI") port configuration help information to display in dialog box 510. In some implementations, no right-click action is required as insight information may be automatically displayed based on a reposition of a cursor.

FIG. 6 is a screen shot showing one possible insight of real-time intelligent contextual information, according to one or more disclosed implementations. The information in FIG. 6 may be contrasted with that shown via a pop up in FIG. 5. In window 600, the same information is shown that was described above for window 500, however, not obscured by a dialog box. Window 600 includes a selection area 605 that indicates the current area of focus for this edit session pointer device, in this example it is "interfacea2". Insights information is shown in three sections 610, 615, and 620 on the right-hand side of window 500. Insights section 610 shows just-in-time (e.g., current) information about the interface currently identified by the point of focus of the edit session (i.e., interfacea2). Insights section 615 shows just-in-time information about devices that are logically close to interfacea2. Insights section 620 shows capabilities for interfacea2. In this manner, insights editor 360 may display pertinent and timely information for a system administrator about the exact interface potentially being updated in an edit session. Note that when the cursor was initially positioned on interfacea2, insights editor may have gathered information (e.g., either directly or via network configuration data repository 340) from interfacea2 so that information presented in insights area 610 would be current. Alternatively, a database query could have been used to obtain insights information but in this example the switch interface itself (interfaca2) was interrogated.

FIG. 7 is a screen shot showing one possible insight of augmented configuration parameter editing, according to one or more disclosed implementations. Window 700 shows information about an insight in insights panel 715. In this example, the insights panel is showing information about two possible NTP servers (area 720) within the current network configuration domain. Area 705 indicates that this may be a multi-editor session showing information for the 3 devices selected in area 705. As mentioned above multi-editor details may be found in the Clark application incorporated by reference above and further details are not pertinent for this specific discussion of window 700. In the example of FIG. 7, the cursor is positioned on line 3 as indicated by reference element 710 and thus, the insights area 720 is displaying information about NTP servers. To complete the discussion of FIG. 7, area 725 shows icons that will be explained with FIG. 9B below.

FIG. 8 is a screen shot showing one possible insight automated conformance validation, according to one or more disclosed implementations. In this example presentation format, the insights area (e.g., insights panel 715 from FIG. 7) is not used. In this example implementation, windows 840, 880 and 848 display conformance validation regarding current conformance information about the network configuration domain (e.g., network configuration domain 305). In other implementations, similar conformance information may be displayed in an insights area if a system administrator changes a network parameter that fails just-in-time validation with respect to conformance criteria. See FIG. 9B.

FIGS. 9A-B are screen shots of possible validation results insights, according to one or more disclosed implementations. FIG. 9A shows window 900 containing information about currently running validation test as indicated in area 905. Area 910 shows current test status and area 915 shows examples of root cause analysis. In one example, if a user were to begin to edit a network device that was currently under test, an insight could be provided with information similar to that of window 900 so that the system administrator would be informed that a test run was in progress and the current status of that test run. Accordingly, the system administrator may use extra care not to change any configuration parameter values for that network device in the middle of the test run.

FIG. 9B is a screen shot showing window 950 that includes insights panel 960. In area 995 of insights panel 960, conformance results (e.g., similar to those of FIG. 8) are shown. Elements 970 and 975 illustrate icons that may be associated with particular configuration settings that have been determined to be suspect with respect to the conformance failure. Finally, area 980 illustrates a list of icons representing different statuses of conformance test results. In one example implementation, selection of an icon in area 980 would reposition the contents of window 950 to include the next occurrence of a line with that same indication status.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
providing an augmented editor for network configuration parameter settings;
receiving an indication, from a graphical user interface presenting the augmented editor, that a parameter value associated with a network device configuration file for a first network device has been identified for update;
determining valid completion values for the parameter value based on information in a network configuration data repository, the networking configuration data repository containing information about the first network device and other devices within a network configuration domain that includes the first device;
providing information regarding the valid completion values for the parameter value to the graphical user interface, wherein the valid completion values are to be displayed in a window of the graphical user interface;
displaying the valid completion values;
updating the parameter value with a new parameter value, the new parameter value is one of the valid completion values; and
receiving an indication, via the graphical user interface, that the parameter value has been updated with the new parameter value.

2. The method of claim 1, further comprising initiating a command query of the first network device to obtain current configuration information prior to providing information regarding possible completion values.

3. The method of claim 2, wherein results of the command query are used as part of determining possible valid completion values.

4. The method of claim 1; further comprising requesting initiation of a command on the first network device to obtain current configuration information prior to providing information regarding the completion values.

5. The method of claim 4, wherein results of the command are used as part of determining the valid completion values.

6. The method of claim 1, further comprising interrogating time series data collected within the network configuration domain as part of determining the valid completion values.

7. The method of claim 1, further comprising analyzing security standards information for the network configuration domain as part of determining the valid completion values.

8. The method of claim 1, further comprising:
receiving a selection of one of the valid completion values; and
instructing the augmented editor to use at least a portion of the provided information to perform completion of entry of the parameter value based on the selection.

9. The method of claim 1, further comprising:
obtaining the new parameter value from the augmented editor; and
performing a just-in-time validation of the new parameter value.

10. The method of claim 1, wherein the graphical user interface presenting the augmented interface is a remotely connected graphical user interface.

11. The method of claim 10, wherein the remotely connected graphical user interface is prepared for a laptop, smart phone, or other mobile device.

12. The method of claim 10, wherein the remotely connected graphical user interface is provided on a processing device external to the network configuration domain.

13. The method of claim 1, further comprising:
obtaining the new parameter value from the augmented editor;
determining portions of time series data pertinent to both the new parameter value and the first network device;
determine a first set of attributes of the network configuration domain that may be affected by the new parameter value; and
performing a validation of the new parameter value using the portions of time series data and the first set of attributes.

14. The method of claim 1, further comprising:
providing configuration documentation information regarding the parameter value along with the information regarding the valid completion values.

15. The method of claim 1, further comprising:
obtaining the new parameter value from the augmented editor; and
performing a just-in-time validation of the new parameter value, in part, by running a simulation of at least a portion of the network configuration domain with the using the new parameter value for the first network device.

16. A non-transitory computer readable medium comprising computer executable instructions stored thereon to cause one or more processing units to perform a method comprising:
providing an augmented editor for network configuration parameter settings
receiving an indication, from a graphical user interface presenting the augmented editor, that a parameter value associated with a network device configuration file for a first network device has been identified for update;
determining valid completion values for the parameter value based on information in a network configuration data repository, the networking configuration data repository containing information about the first network device and other devices within a network configuration domain that includes the first device;
providing information regarding possible the valid completion values for the parameter value to the graphical user, wherein the valid completion values are to be displayed in a window of the graphical user interface;
updating the parameter value with a new parameter value, the new parameter value is one of the valid completion values;
displaying the valid completion values; and
receiving an indication, via the graphical user interface, that the parameter value has been updated with the parameter value.

17. The non-transitory computer readable medium of claim 16, where the method further comprises:
obtaining the new parameter value from the augmented editor; and
performing a just-in-time validation of the new parameter value.

18. A computer system, comprising:
a network communications interface;
a memory; and
one or more processing units, communicatively coupled to the memory and the network communications interface, wherein the memory stores instructions, that when executed by the one or more processing units, cause the one or more processing units to provide an augmented editor function, the augmented editor function configured to;
receive an indication, from a graphical user interface presenting the augmented editor, that a parameter value associated with a network device configuration file for a first network device has been identified for update;
determine valid completion values for the parameter value based on information in a network configuration data repository, the networking configuration data repository containing information about the first network device and other devices within a network configuration domain that includes the first device;
provide information regarding the valid completion values for the parameter value to the graphical user, wherein the valid completion values are to be displayed in a window of the graphical user interface;
display the valid completion values;
update the parameter value with a new parameter value, the new parameter value is one of the valid completion values; and
receive an indication, via the graphical user interface, that the parameter value has been updated with the new parameter value.

19. The computer system of claim 18, wherein the augmented editor function is further configured to:
obtain the new parameter value from the augmented editor; and
perform a just-in-time validation of the new parameter value.

20. The computer system of claim 18, wherein the augmented editor function is further configured to:
obtain the new parameter value from the augmented editor; and
perform a just-in-time validation of the new parameter value, in part, by running a simulation of at least a portion of the network configuration domain with the using the new parameter value for the first network device.

* * * * *